(12) United States Patent
Fujii et al.

(10) Patent No.: US 8,281,048 B2
(45) Date of Patent: Oct. 2, 2012

(54) INFORMATION PROCESSING APPARATUS AND METHOD FOR DETECTING A TYPE OF APPARATUS CONNECTED TO A CONNECTOR THEREOF

(75) Inventors: Daisuke Fujii, Tokyo (JP); Masanari Kato, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/776,696

(22) Filed: May 10, 2010

(65) Prior Publication Data
US 2010/0293302 A1  Nov. 18, 2010

(30) Foreign Application Priority Data
May 18, 2009 (JP) .................. 2009-120216

(51) Int. Cl.
*G06F 3/00* (2006.01)
(52) U.S. Cl. .......................... 710/16; 710/15
(58) Field of Classification Search ............... 710/1, 15, 710/16
See application file for complete search history.

(56) References Cited

U.S. PATENT DOCUMENTS

| | | | |
|---|---|---|---|
| 2002/0169915 A1 | 11/2002 | Wu | |
| 2003/0052547 A1 | 3/2003 | Fischer | |
| 2007/0106824 A1 | 5/2007 | Hikita | |
| 2008/0272741 A1* | 11/2008 | Kanamori | 320/137 |
| 2008/0303486 A1 | 12/2008 | Kao | |
| 2009/0009187 A1 | 1/2009 | Kwak | |
| 2010/0201308 A1* | 8/2010 | Lindholm | 320/107 |

FOREIGN PATENT DOCUMENTS

| | | |
|---|---|---|
| CN | 101320080 A | 12/2008 |
| WO | 2008001153 A1 | 1/2008 |

OTHER PUBLICATIONS

International Search Report for corresponding EP Application No. 10004878.4, dated Aug. 11, 2010.
Office Action for corresponding CN Application 201010183101.9, dated Dec. 23, 2011.
Office Action for corresponding EP Application 10004878.4-1229, dated May 7, 2012.

\* cited by examiner

*Primary Examiner* — Chun-Kuan Lee
*Assistant Examiner* — Richard B Franklin
(74) *Attorney, Agent, or Firm* — Matthew B. Dernier, Esq.; Gibson & Dernier LLP (57) ABSTRACT

An information processing apparatus includes a connector that conforms to a Universal Serial Bus standard. The information processing apparatus detects voltages at signal terminals of the connector a plurality of times, and judges a type of an apparatus connected to the connector by using detection results obtained the plurality of times.

5 Claims, 5 Drawing Sheets

INFORMATION PROCESSING APPARATUS AND METHOD FOR DETECTING A TYPE OF APPARATUS CONNECTED TO A CONNECTOR THEREOF

BACKGROUND OF THE INVENTION

1. Field of the Invention

The present invention relates to an information processing apparatus including a connector that conforms to a Universal Serial Bus (USB) standard, a control method therefor, a program, and an information storage medium.

2. Description of the Related Art

A Universal Serial Bus (USB) standard is widely used as a standard for allowing various information processing apparatuses to perform data transfer with another apparatus. The information processing apparatuses including an interface that conforms to the USB standard are classified into two kinds which are a USB host and a USB device. The USB host and the USB device are connected to each other via a USB connector provided to each of the apparatuses. According to the USB standard, a connection line connecting between the USB host and the USB device includes two signal lines (D+ and D−), a ground line (GND), and a power supply line (VBUS). The USB host is capable of supplying the USB device with power necessary to operate or charge the USB device via the power supply line. Under normal conditions, when the USB host and the USB device are connected to each other, the USB device senses the connection to the USB host in response to the power supplied from the USB host via the power supply line, and transmits information on itself to the USB host. The USB host judges a type of the USB device connected thereto based on the information transmitted from the USB device, and performs communications with the USB device according to the judged type (see, for example, US 2007/0106824).

SUMMARY OF THE INVENTION

In addition to the USB host, a charger that performs only power supply to the USB device without performing data communications and other such apparatuses may be connected to a USB connector provided to the USB device. Therefore, depending upon the kind of the connected apparatus, the USB device may not need to transmit information on itself to the connected apparatus. In addition, depending upon the kind of the connected apparatus, the USB device may need to perform switching as to whether or not to receive the power supply for charging. This is because, if the USB device requests the USB host such as a personal computer for the same power as in a case where the charger is connected, the USB host attempts to output a current or voltage larger than that originally intended, which may impose a load on the USB host. In view of such various circumstances, the USB device may be demanded to accurately judge the type of the apparatus connected to the USB connector.

The present invention has been made in view of the above-mentioned circumstances, and therefore one object thereof is to provide an information processing apparatus capable of accurately judging a type of an apparatus connected thereto via a USB connector, a control method therefor, a program, and an information storage medium.

An information processing apparatus according to the present invention includes: a connector that conforms to a Universal Serial Bus standard; a detector that detects voltages at signal terminals of the connector a plurality of times; and a judgment section that judges a type of an apparatus connected to the connector by using detection results obtained the plurality of times.

In the above-mentioned information processing apparatus, the detector may detect respective voltages at two of the signal terminals of the connector, and the judgment section may judge the type of the apparatus connected to the connector by judging a connection state between the two of the signal terminals by using the respective voltages at the two of the signal terminals.

Further, in the above-mentioned information processing apparatus, if it is judged that two of the signal terminals of the connector are open-circuited therebetween after power supply with respect to a power supply terminal is detected, the detector may repeat detection of the voltages at the two of the signal terminals.

Further, in the above-mentioned information processing apparatus, the detector may repeat detection of the voltages at regular intervals while a charger is connected via the connector, and the judgment section may stops charging if it is judged as a result of the judging that the apparatus connected via the connector has been changed from the charger to another apparatus.

Further, according to the present invention, a control method for an information processing apparatus including a connector that conforms to a Universal Serial Bus standard includes: detecting voltages at signal terminals of the connector a plurality of times; and judging a type of an apparatus connected to the connector by using detection results obtained the plurality of times.

Further, according to the present invention, a computer-readable information storage medium has a program recorded thereon. The program causes an information processing apparatus including a connector that conforms to a Universal Serial Bus standard to function as: a detector that detects voltages at signal terminals of the connector a plurality of times; and a judgment section that judges a type of an apparatus connected to the connector by using detection results obtained the plurality of times.

DETAILED DESCRIPTION OF THE INVENTION

Hereinafter, detailed description is made of an embodiment of the present invention based on the accompanying drawings.

Figure 1:
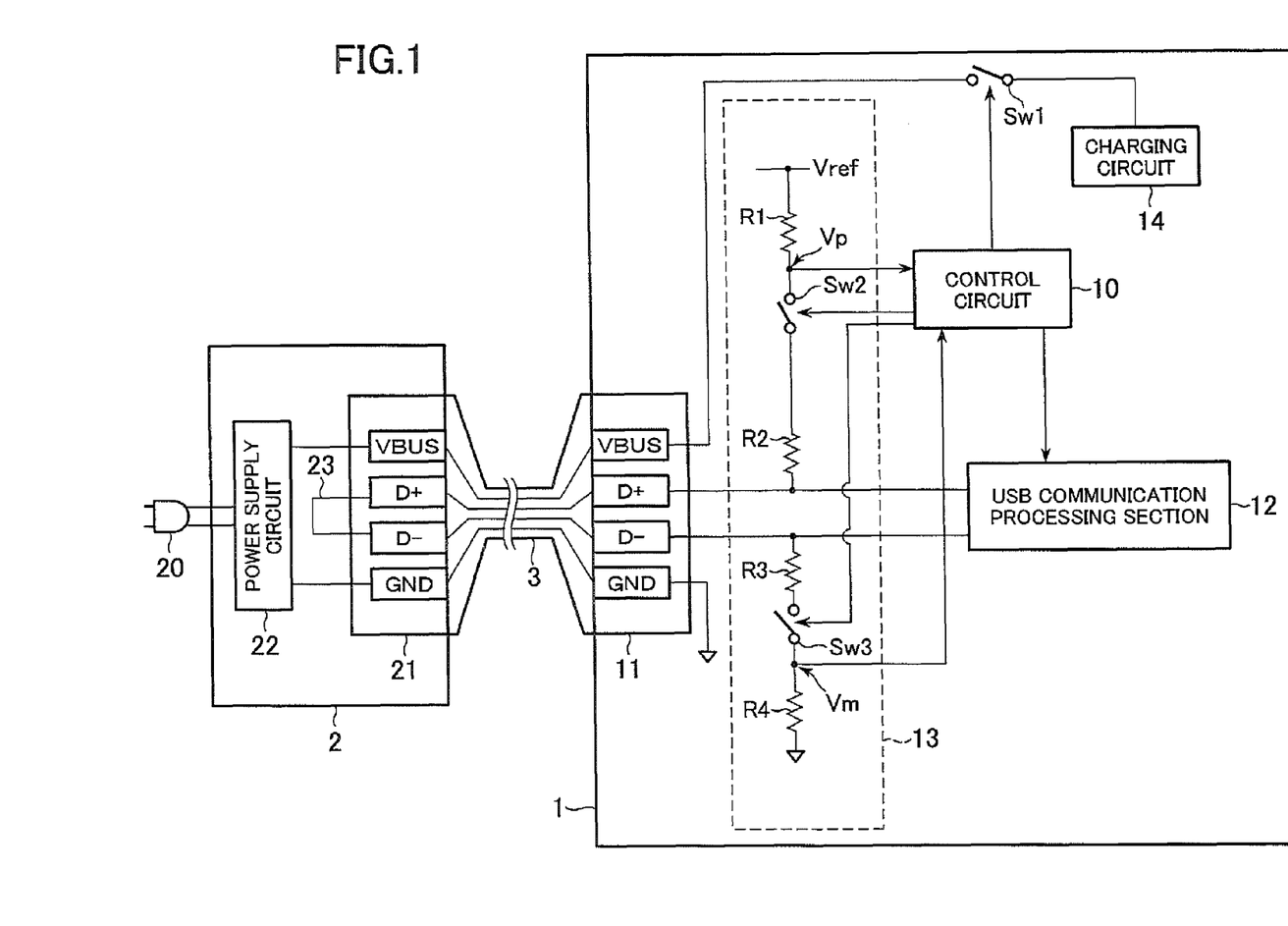
FIG. 1 is a configuration diagram illustrating a schematic configuration of an information processing apparatus according to an embodiment of the present invention and a charger connected thereto.

As illustrated in FIG. 1, an information processing apparatus 1 according to the embodiment of the present invention includes a control circuit 10, a USB connector 11, a USB communication processing section 12, a detection circuit 13, and a charging circuit 14, and operates as a USB device compliant with a USB standard. FIG. 1 illustrates a state in which a charger 2 is connected to the USB connector 11 of the information processing apparatus 1 via a USB cable 3. However, an apparatus to be connected to the USB connector 11 of the information processing apparatus 1 is not limited to the charger 2. Specifically, a USB host (such as a personal computer) compliant with the USB standard can be connected to the information processing apparatus 1 via the USB cable 3. Hereinafter, the apparatus that is connected to the USB connector 11 of the information processing apparatus 1 is referred to generically as a USB connection apparatus.

The control circuit 10 is a microcomputer or the like, and performs various information processings according to a pre-stored program. Specifically, in this embodiment, the control circuit 10 controls the detection circuit 13 to execute a processing of judging a type of the USB connection apparatus. A specific example of the processing executed by the control circuit 10 in this embodiment is described later.

The USB connector 11 is located on an external surface of the information processing apparatus 1, and is connected to the USB cable 3. In this embodiment, the USB connector 11 includes a D+terminal and a D− terminal that are signal terminals to which signal lines are connected, a GND terminal to which a ground line is connected, and a VBUS terminal (power supply terminal) to which a power supply line is connected. Note that the USB connector 11 may include another terminal.

In a case where the USB connection apparatus is a USB host such as a personal computer, the USB communication processing section 12 performs transmission/reception of data to/from the USB host via the two signal lines.

The detection circuit 13 is used for detection of voltages at the signal terminals of the USB connector 11, which is performed by the control circuit 10. An example of the configuration of the detection circuit 13 and a method of detecting the voltage at the signal terminal by using the detection circuit 13 are described later.

The charging circuit 14 is connected to the VBUS terminal of the USB connector 11 via a switch Sw1, and performs charging of a capacitor device built into the information processing apparatus 1 by power supplied from the charger 2 via the VBUS terminal.

The charger 2 is an apparatus for charging the information processing apparatus 1, and includes a power supply plug 20 for connection to a socket (outlet) that supplies commercial power (AC 100-V power or the like). The charger 2 converts the power supplied via the power supply plug 20 into a DC power of 5 V by a power supply circuit 22, and outputs the DC power from the VBUS terminal of the USB connector 21. The power output from the VBUS terminal is used to perform the charging of the information processing apparatus 1.

Hereinafter, description is made of the example of the configuration of the detection circuit 13 and an example of the method of detecting the voltages at the signal terminals by using the detection circuit 13. Of the USB connection apparatuses, in the USB host, a resistor having a predetermined resistance value is connected between the D+ terminal and the D− terminal. Meanwhile, in the charger 2, as illustrated in FIG. 1, the D+ terminal and the D− terminal are short-circuited therebetween by a wiring 23. Therefore, the control circuit 10 uses the detection circuit 13 to apply a voltage between the D+ terminal and the D− terminal, and measures the voltage between the two terminals. This allows the control circuit 10 to distinguish whether the D+ terminal and the D− terminal are open-circuited or short-circuited therebetween or whether or not the resistor having the predetermined resistance value is connected between the D+ terminal and the D− terminal. Then, if the D+ terminal and the D− terminal are short-circuited therebetween, it is judged that the charger 2 is connected, while if the resistor having the predetermined resistance value is connected, it is judged that USB host other than the charger 2 is connected.

Specifically, in FIG. 1, the detection circuit 13 includes switches Sw2 and Sw3 and resistors R1, R2, R3, and R4. A predetermined reference voltage Vref is applied to one end of the resistor R1. The other end of the resistor R1 is connected to the D+ terminal of the USB connector 11 via the switch Sw2 and the resistor R2 in the stated order. In addition, the other end of the resistor R1 is also connected to the control circuit 10. Thus, a signal indicating a voltage Vp on a D+ terminal side of the resistor R1 is input to the control circuit 10.

Meanwhile, the D− terminal of the USB connector 11 is connected to the resistor R4 via the resistor R3 and the switch Sw3 in the stated order, and one end of the resistor R4 on a side opposite to the switch Sw3 is connected to a ground. In addition, the other end of the resistor R4 on a D− terminal side is connected to the control circuit 10 in the same manner as the case of the resistor R1. Thus, a signal indicating a voltage Vm on the D− terminal side of the resistor R4 is input to the control circuit 10.

When detecting the voltage at the signal terminal, the control circuit 10 outputs a control signal for turning on both the switches Sw2 and Sw3. At this time, if the D+ terminal and the D− terminal are electrically connected therebetween in the USB connection apparatus, a current is made to flow by the reference voltage Vref through the resistor R1, the switch Sw2, the resistor R2, the D+ terminal, the USB connection apparatus, the D− terminal, the resistor R3, the switch Sw3, and the resistor R4 in the stated order. Here, if the resistance values of the resistors R2 and R3 are sufficiently smaller than the resistance values of the resistors R1 and R4, the reference voltage Vref is divided mainly by the resistor R1, a resistor between the D+ terminal and the D− terminal, and the resistor R4. Accordingly, the voltage Vp and the voltage Vm approximately match with the voltage at the D+ terminal and the voltage at the D− terminal, respectively, and by measuring those voltages, it is possible to detect a connection state between the D+ terminal and the D− terminal. That is, the control circuit 10 uses the values of the voltage Vp and the voltage Vm to distinguish whether or not the resistor having the predetermined resistance value is connected between the D+ terminal and the D− terminal in the USB connection apparatus or whether or not the D+ terminal and the D− terminal are short-circuited therebetween.

Note that if the D+ terminal and the D− terminal are open-circuited therebetween, the voltage Vp approximately matches with the reference voltage Vref, while the voltage Vm approximately matches with a ground voltage (=0 V). Accordingly, if a potential difference between the voltage Vp and the voltage Vm is approximately equal to the reference voltage Vref, it is possible to distinguish that the D+ terminal and the D− terminal are open-circuited therebetween (that is, the USB connection apparatus is not connected to the signal terminal of the USB connector 11).

Figure 2:
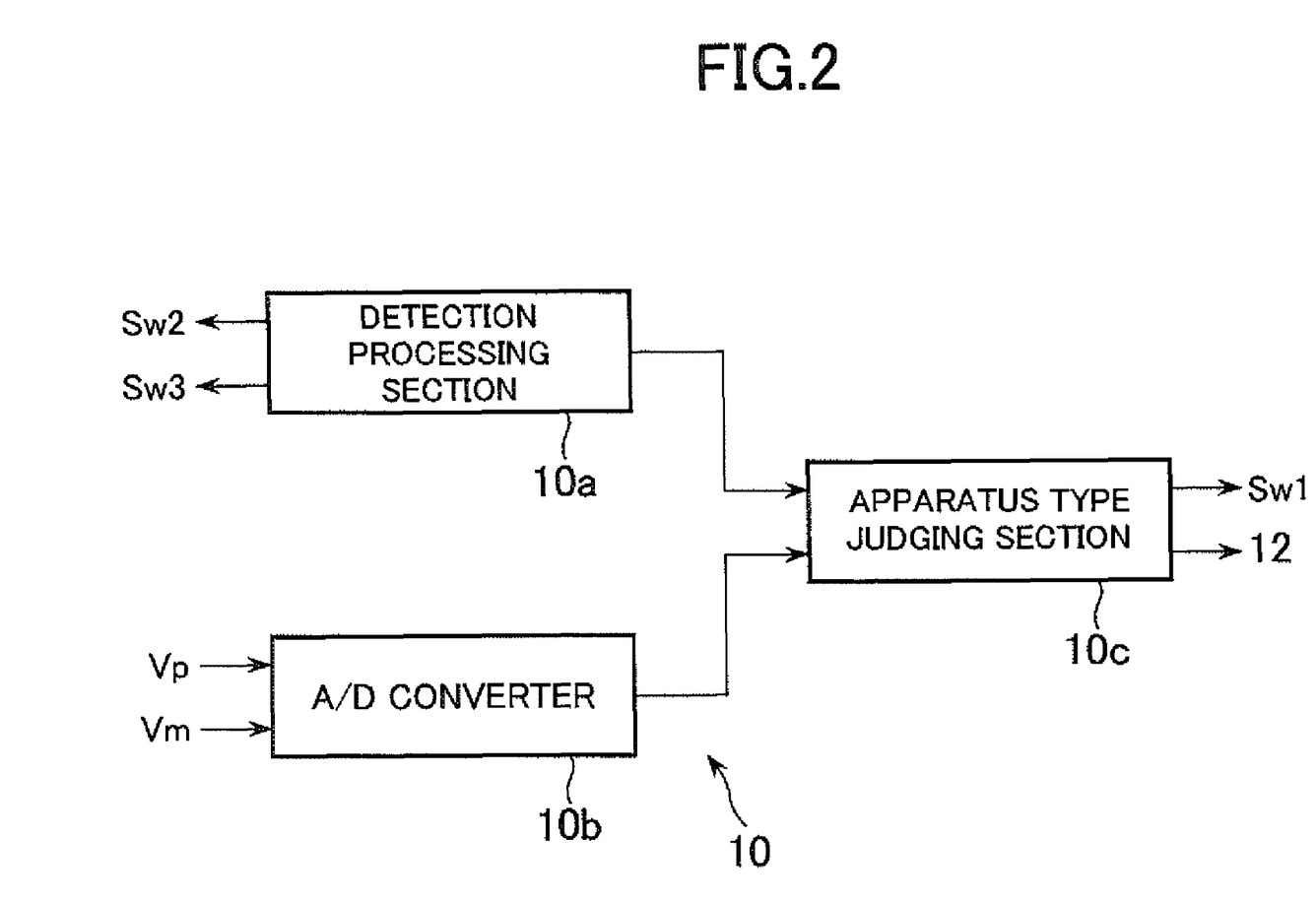
FIG. 2 is a functional block diagram illustrating an example of functions of a control circuit.

FIG. 2 is a functional block diagram illustrating an example of functions of the control circuit 10. As illustrated in FIG. 2, the control circuit 10 includes a detection processing section 10a, an A/D converter 10b, and an apparatus type judging section 10c. The detection processing section 10a and the apparatus type judging section 10c are implemented by the control circuit 10 executing a predetermined control program. The control program may be written to a ROM built into the control circuit 10 in advance, or may be provided to the information processing apparatus 1 by being read from various computer-readable information storage media. Alternatively, the control program may be provided to the information processing apparatus 1 via a communication network such as the Internet.

The detection processing section 10a outputs the control signal for turning on the switches Sw2 and Sw3 at a predetermined timing to cause the detection circuit 13 to operate. Thus, the voltages at the D+ terminal and the D− terminal of the USB connector 11 are detected. In this embodiment, after sensing the power supply from the VBUS terminal (that is, sensing the connection to the USB connection apparatus), the detection processing section 10a causes the detection circuit 13 to operate a plurality of times to thereby execute the detection of the voltages at the signal terminals a plurality of times. An example of deciding a timing at which the detection processing section 10a causes the detection circuit 13 to operate is described later.

The A/D converter 10b converts analog signals indicating the voltages Vp and Vm input from the detection circuit 13 into digital signals. Accordingly, the control circuit 10 acquires respective digital values of the voltages Vp and Vm when the detection circuit 13 operates.

The apparatus type judging section 10c uses the values of the voltages Vp and Vm acquired by the A/D converter 10b to judge the type of the USB connection apparatus. Specifically, as described above, if the voltages Vp and Vm are approximately equal to the reference voltage Vref and 0, respectively, the apparatus type judging section 10c judges that the signal terminals are open-circuited therebetween. In addition, if both the values of the voltages Vp and Vm approximately match with values determined based on the reference voltage Vref and a ratio between the resistance values of the resistor R1 and the resistor R4, the apparatus type judging section 10c judges that the signal terminals are short-circuited therebetween (that is, the charger 2 is connected). In addition, if the value of (Vp−Vm) is between 0 and the value of the reference voltage Vref, the apparatus type judging section 10c judges that a resistor having a resistance value calculated based on the value (Vp−Vm) is connected. If it is thus judged that the resistor is connected, the apparatus type judging section 10c judges that the USB host is connected.

Further, the apparatus type judging section 10c performs switching of the switch Sw1 according to a judgment result thereof. That is, if it is judged that the charger 2 is connected, the apparatus type judging section 10c turns on the switch Sw1 to cause the charging circuit 14 to execute the charging operation, while in other cases, the apparatus type judging section 10c turns off the switch Sw1 to separate the charging circuit 14 from the VBUS terminal. This can prevent, when the USB host other than the charger 2 is connected to the USB connector 11, the charging circuit 14 from being operated and resultantly requesting the USB host to supply power that exceeds an allowable range thereof. In addition, if it is judged that the USB connection apparatus is the USB host, the apparatus type judging section 10c outputs the control signal for instructing the USB communication processing section 12 to start a communication processing. In response thereto, the USB communication processing section 12 starts the communication processing with respect to the USB host according to the USB standard.

Hereinafter, description is made of some specific examples of an apparatus type judging processing performed by the control circuit 10. As a first example, a processing executed immediately after the power supply from the VBUS terminal is detected is described with reference to a flowchart of FIG. 3.

Figure 3:
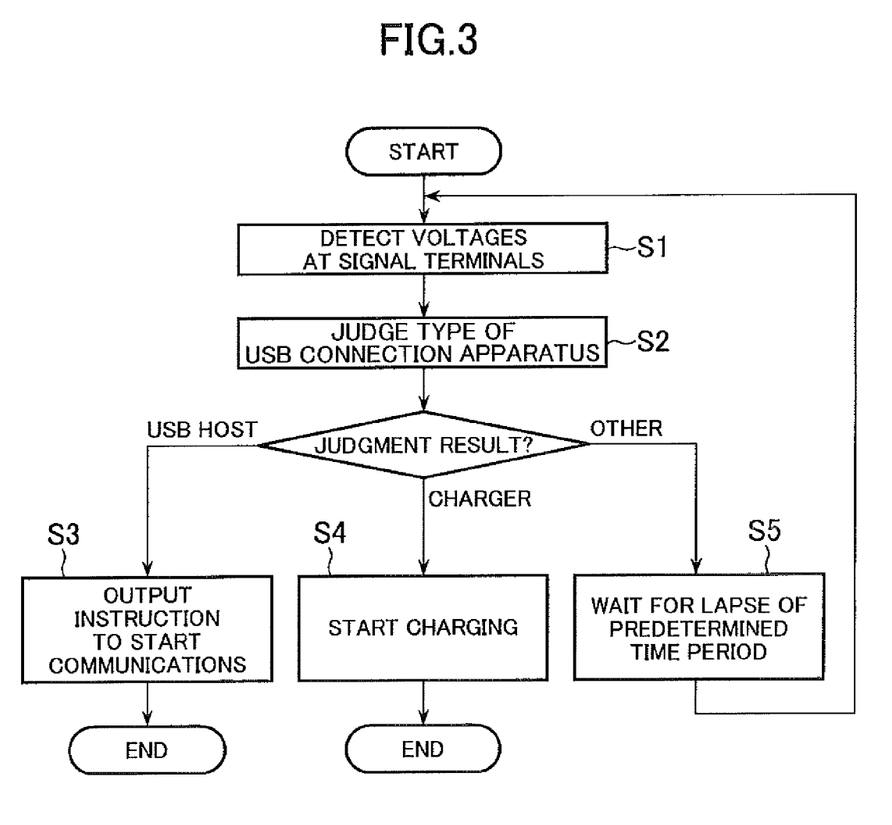
FIG. 3 is a flowchart illustrating an example of a flow of a processing executed by the control circuit.

If the power supply from the VBUS terminal is detected, it is assumed that some USB connection apparatus has been connected to the USB connector 11, and hence the detection processing section 10a of the control circuit 10 first causes the detection circuit 13 to operate. Thus, the respective voltages at the signal terminals are detected, and the detection of the resistance between the signal terminals is performed (S1). The apparatus type judging section 10c uses a detection result thereof to judge the type of the USB connection apparatus (S2). Here, if it is judged that the USB connection apparatus is the USB host, the apparatus type judging section 10c instructs the USB communication processing section 12 to start a USB communication processing (S3). This causes the USB communication processing section 12 to start communications with the USB host. Meanwhile, if it is judged in Step S2 that the USB connection apparatus is the charger 2, the apparatus type judging section 10c turns on the switch Sw1 to cause the charging circuit 14 to start the charging of the information processing apparatus 1 (S4).

Here, of the respective terminals provided to the USB cable 3, the signal terminals (that is, the D+ terminal and the D− terminal) are located at deeper positions than the VBUS terminal and the GND terminal. Therefore, in a case where, for example, a user slowly inserts the USB cable 3 into the USB connector 11, the VBUS terminal of the USB cable 3 is first connected to the USB connector 11, and the information processing apparatus 1 may judge that some USB connection apparatus has been connected thereto while the signal terminals have not been connected to the USB connection apparatus yet. Therefore, in this embodiment, if it is judged in Step S2 that the signal terminals are open-circuited therebetween, the detection processing section 10a waits for a lapse of a predetermined time period (for example, 3 ms) (S5), and the flow returns to Step S1 again to repeat the detection of the resistance between the signal terminals. By thus repeating the detection of the voltages at the signal terminals a plurality of times, even if the user slowly inserts the USB cable 3 into the USB connector 11, it is possible to detect the voltages at the signal terminals after the insertion and judge the type of the USB connection apparatus according to the detection result. Note that if the judgment of the apparatus type is not successful even after the flow is repeated a predetermined number of times or more, the information processing apparatus 1 may output alert information to the effect that the USB cable 3 is not correctly connected (for example, sound an alarm or display an alert message on a screen of the information processing apparatus 1).

Further, in the flow described above, the charging or the USB communication processing starts based on the judgment result obtained one time, but the start of the charging or the start of the USB communication processing may be decided based on the judgment results obtained a plurality of times. That is, the charging may start if the judgment results indicating the charger 2 are obtained a predetermined number of times (for example, twice) continuously, or the USB communication processing may start if the judgment results indicating the USB host are obtained a predetermined number of times continuously.

Figure 4:
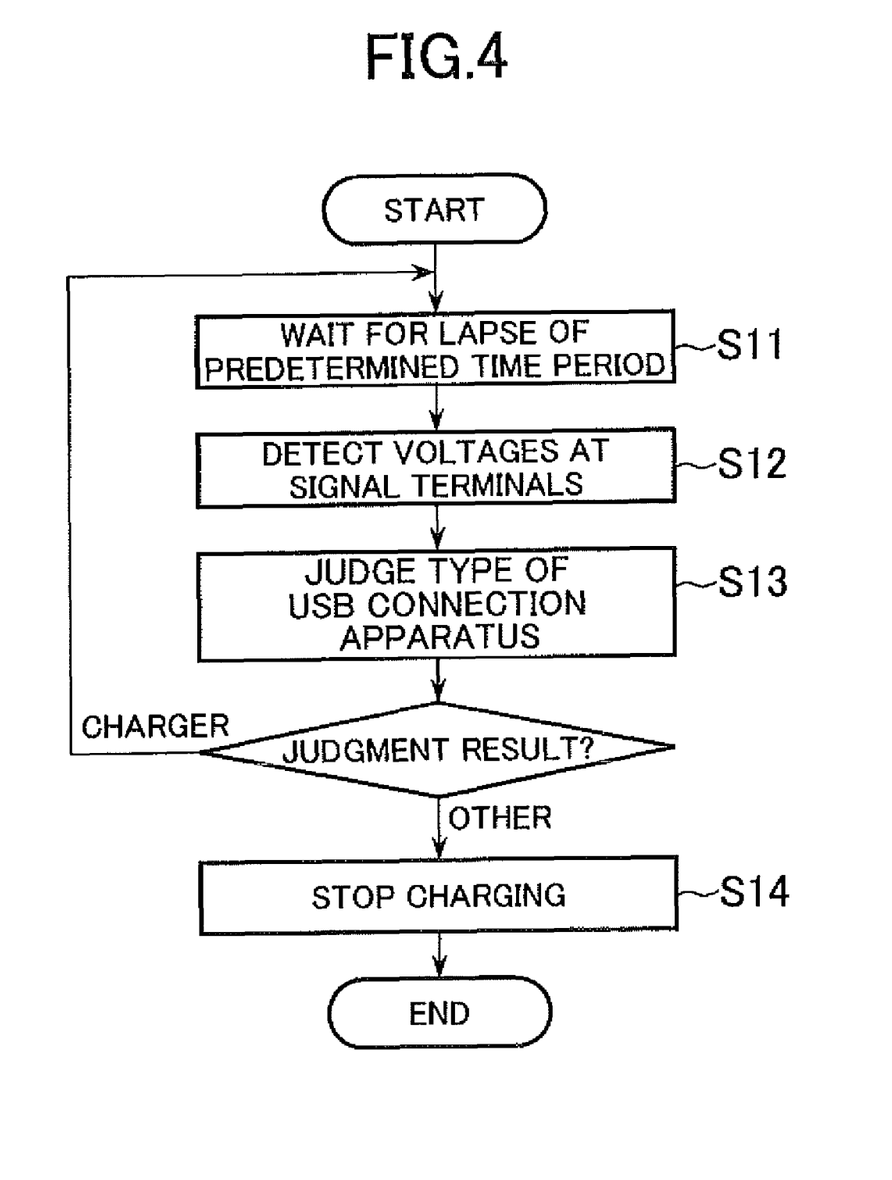
FIG. 4 is a flowchart illustrating another example of the flow of the processing executed by the control circuit.

Next, a second example of the apparatus type judging processing is described with reference to a flowchart of FIG. 4. Here, description is made of an example of a processing executed by the control circuit 10 after it is judged by the above-mentioned first example that the USB connection apparatus is the charger 2 and the charging is started by the charging circuit 14. Under normal conditions, the power supply from the VBUS terminal is stopped if the connection between the charger 2 and the information processing apparatus 1 is separated by the user pulling out the USB cable 3, and hence by monitoring the output from the VBUS terminal, the information processing apparatus 1 can decide the timing to stop the charging performed by the charging circuit 14. However, for example, if the charger 2 is connected to the information processing apparatus 1 via a USB hub, and if a selector switch provided to the USB hub is used to switch a connection destination of the information processing apparatus 1 from the charger 2 to a USB host other than the charger 2, the power supply to the VBUS terminal is continued by the USB host after the switching. Therefore, only by monitoring the output from the VBUS terminal, the information processing apparatus 1 may fail to sense such switching of the USB connection apparatus. Then, in such a case, if the charging circuit 14 requests the USB host after the switching to supply power, there is a fear that a load may be imposed on the USB host. In addition, even if there occurs a malfunction in the charger 2 during the charging, it may not be possible to detect such a malfunction only by monitoring the VBUS terminal. Therefore, according to the second example, it becomes possible to sense the above-mentioned switching of the USB connection apparatus and the above-mentioned malfunction in the charger 2 by detecting the voltages at the signal terminals.

Specifically, in the second example, after the start of the charging, the detection processing section 10a of the control circuit 10 waits for a lapse of a predetermined time period (for example, 200 ms) (S11), and then causes the detection circuit 13 to operate. Thus, the detection of the voltages at the signal terminals is performed (S12). The apparatus type judging section 10c uses the detection result to judge the type of the USB connection apparatus (S13). Here, if it is judged that the USB connection apparatus is the charger 2, the flow returns to Step S11 to wait again for a lapse of the predetermined time period and perform the detection of the voltages at the signal terminals. That is, the control circuit 10 keeps executing the voltage detection repeatedly at regular intervals while it is judged that the USB connection apparatus is the charger 2.

Meanwhile, if it is judged in Step S13 that the USB connection apparatus is other than the charger 2, the apparatus type judging section 10c turns off the switch Sw1 to cause the charging circuit 14 to stop the charging of the information processing apparatus 1 (S14). By executing such a processing, in a case where there has occurred a malfunction in the connected charger 2, a case where the USB connection apparatus has been switched from the charger 2 to a USB host other than the charger 2, or other such case, the information processing apparatus 1 can turn off the charging circuit 14 to send no further power supply request to the USB connection apparatus. In addition, as described above, the signal terminals are located at deeper positions than the VBUS terminal or the like, and hence, for example, in a case where there is a fear of disconnection regardless of the connected VBUS terminal such as a case where the USB cable 3 is about to fall out, the signal terminals are first disconnected. Therefore, by detecting that the signal terminals are open-circuited therebetween, the information processing apparatus 1 can stop the charging prior to the disconnection of the VBUS terminal if there is a fear that the VBUS terminal may be disconnected.

As described above, according to the information processing apparatus 1, after sensing that the USB connection apparatus has been connected, the detection of the voltages at the signal terminals is executed a plurality of times, and the results are used to judge the type of the USB connection apparatus, which makes it possible to judge the type of the USB connection apparatus even in a case where the USB connection apparatus has been slowly connected to the USB connector 11, a case where the USB connection apparatus has been switched during the charging, or other such case.

Note that the embodiment of the present invention is not limited to the above-mentioned embodiment. For example, in the above description, the signal terminals of the charger 2 are assumed to be short-circuited therebetween, but the resistor having the predetermined resistance value may be connected between the signal terminals of the charger 2. Also in this case, if the resistance value is known in advance, the information processing apparatus 1 can judge whether or not the USB connection apparatus is the charger 2 by calculating the resistance value between the signal terminals based on the respective voltage values at the signal terminals and judging whether or not the calculated resistance value matches with the prestored resistance value of the charger 2.

Figure 5:
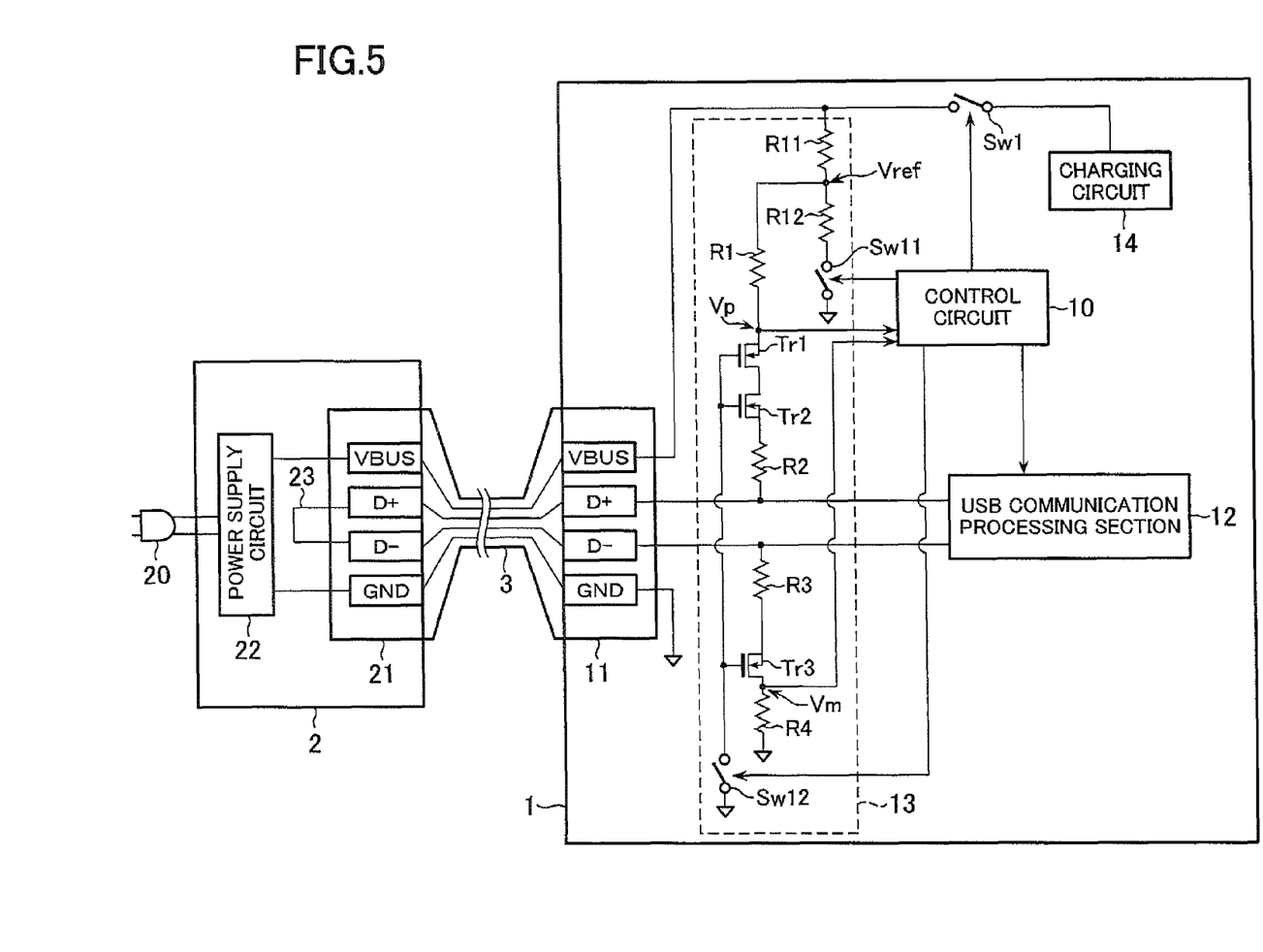
FIG. 5 is a configuration diagram illustrating another example of the configuration of the information processing apparatus according to the embodiment of the present invention.

Further, the configuration of the detection circuit 13 is not limited to the configuration illustrated in FIG. 1. FIG. 5 is a diagram illustrating a configuration of the information processing apparatus including the detection circuit 13 of a kind other than that of FIG. 1. Note that in FIG. 5, the same components as those of FIG. 1 are denoted by the same reference symbols.

In the example of FIG. 5, in addition to the resistors R1, R2, R3, and R4 that play the same roles as those in FIG. 1, the detection circuit 13 includes resistors R11 and R12 for outputting the reference voltage Vref. In addition, instead of the switches Sw2 and Sw3, the detection circuit 13 includes switches Sw11 and Sw12 and transistors Tr1, Tr2, and Tr3. One end of the resistor R11 is connected to the VBUS terminal of the USB connector 11, and the other end of the resistor R11 is connected to one end of the resistor R12 and one end of the resistor R1. The other end of the resistor R12 is connected to a ground via the switch Sw11.

In addition, the other end of the resistor R1 is connected to the D+ terminal of the USB connector 11 via the transistor Tr1, the transistor Tr2, and the resistor R2 in the stated order. Further, the other end of the resistor R1 is connected to the control circuit 10. Thus, the signal indicating the voltage Vp of the resistor R1 on the D+ terminal side is input to the control circuit 10.

Meanwhile, the D− terminal of the USB connector 11 is connected to the resistor R4 via the resistor R3 and the transistor Tr3 in the stated order, and one end of the resistor R4 on the side opposite to the transistor Tr3 is connected to a ground. In addition, the other end of the resistor R4 on the D− terminal side is connected to the control circuit 10 in the same manner as the case of the resistor R1. Thus, the signal indicating the voltage Vm of the resistor R4 on the D− terminal side is input to the control circuit 10. In addition, the transistors Tr1, Tr2, and Tr3 are all connected to the switch Sw12 so as to turn on when the switch Sw12 is turned on.

In the example of FIG. 5, when detecting the voltages at the signal terminals, the control circuit 10 outputs a control signal for turning on both the switches Sw11 and Sw12. If power of a constant voltage is supplied from the USB connection apparatus via the VBUS terminal, a current flows from the VBUS terminal through the resistors R11 and R12 when the switch Sw11 is turned on, and the predetermined reference voltage Vref determined based on a ratio between the resistance values of the resistor R11 and the resistor R12 is applied to the one end of the resistor R1. As an example thereof, assuming that the resistance value of the resistor R11 and the resistance value of the resistor R12 are 1 kΩ and 1.8 kΩ, respectively, if the voltage of 5 V specified according to the USB standard is output from the VBUS terminal, the power supply voltage of 5 V is divided by the resistor R11 and the resistor R12, with the result that the reference voltage Vref of approximately 3.2 V is applied to the one end of the resistor R1.

Further, as described above, the transistors Tr1, Tr2, and Tr3 become conductive when the switch Sw12 is turned on. Thus, if the D+ terminal and the D− terminal are electrically connected to each other in the USB connection apparatus, a part of the current flowing from the VBUS terminal to the resistor R11 flows through the resistor R1, the transistors Tr1 and Tr2, the resistor R2, the D+ terminal, the USB connection apparatus, the D− terminal, the resistor R3, the transistor Tr3, and the resistor R4 in the stated order. Thus, in the same manner as the case of FIG. 1, the reference voltage Vref is divided by the resistor R1, the resistor between the D+ terminal and the D− terminal, and the resistor R4. Accordingly, by measuring the voltages Vp and Vm, the control circuit 10 can detect whether or not the D+ terminal and the D− terminal are short-circuited or open-circuited therebetween or whether or not the resistor having the predetermined resistance value is connected between the two terminals.

While there have been described what are at present considered to be certain embodiments of the invention, it will be understood that various modifications may be made thereto, and it is intended that the appended claims coverall such modifications as fall within the true spirit and scope of the invention.

What is claimed is:

1. An information processing apparatus, comprising:
    a connector that conforms to a Universal Serial Bus standard, the connector including first and second signal terminals;
    a charger circuit operable to receive power supplied from a charger that is connected via the connector, and to charge one or more devices within the information processing apparatus;
    a detector that detects voltages at the first and second signal terminals of the connector a plurality of times and repeats such detection of the voltages at regular intervals while charging is performed by the charger circuit; and
    a judgment section that judges a type of an apparatus connected to the connector by analyzing the voltages at the first and second signal terminals obtained the plurality of times, and that controls the charger circuit to stop charging if it is judged that the apparatus connected via the connector has been changed from the charger to another apparatus,
    wherein the charger circuit stops sending power supply requests to the connected apparatus if it is judged that the apparatus connected via the connector has been changed from the charger to the another apparatus.

2. The information processing apparatus according to claim 1, wherein:
    the detector detects respective voltages at each of the first and second signal terminals of the connector; and
    the judgment section judges the type of the apparatus connected to the connector by judging a connection state between the first and second signal terminals by using the respective voltages at the first and second signal terminals.

3. The information processing apparatus according to claim 1, wherein, if it is judged that the first and second signal terminals of the connector are open-circuited therebetween after a power supply with respect to a power supply terminal is detected, the detector repeats detection of the voltages at the first and second signal terminals.

4. A control method for an information processing apparatus comprising a connector that conforms to a Universal Serial Bus standard, the connector including first and second signal terminals, the control method comprising:
    receiving power, supplied from a charger that is connected via the connector, at a charger circuit of the information processing apparatus, and charging one or more devices within the information processing apparatus;
    detecting voltages at the first and second signal terminals of the connector a plurality of times and repeating such detecting of the voltages at regular intervals while charging is performed by the charger circuit;
    judging a type of an apparatus connected to the connector by analyzing the voltages at the first and second signal terminals obtained the plurality of times, and controlling the charger circuit to stop charging if it is judged that the apparatus connected via the connector has been changed from the charger to another apparatus; and
    turning off the charger circuit such that the charger circuit stops sending power supply requests to the connected apparatus if it is judged that the apparatus connected via the connector has been changed from the charger to the another apparatus.

5. A computer-readable information storage medium having a program recorded thereon, the program causing an information processing apparatus, which includes a connector that conforms to a Universal Serial Bus standard, the connector including first and second signal terminals, to function as:
    a charger circuit operating to receive power, supplied from a charger that is connected via the connector, and charging one or more devices within the information processing apparatus;
    a detector that detects voltages at the first and second signal terminals of the connector a plurality of times and repeats such detecting of the voltages at regular intervals while charging is performed by the charger circuit; and
    a judgment section that judges a type of an apparatus connected to the connector by analyzing the voltages at the first and second signal terminals obtained the plurality of times, and controls the charger circuit to stop charging if it is judged that the apparatus connected via the connector has been changed from the charger to another apparatus,
    wherein the charger circuit stops sending power supply requests to the connected apparatus if it is judged that the apparatus connected via the connector has been changed from the charger to the another apparatus.

* * * * *